(12) United States Patent
Paine

(10) Patent No.: US 6,555,765 B2
(45) Date of Patent: Apr. 29, 2003

(54) METHOD AND APPARATUS FOR DETERMINING THE WEIGHT OF THE CONTENTS OF A VESSEL

(76) Inventor: Alan Paine, 276 E. Arrow Hwy., San Dimas, CA (US) 91773

( * ) Notice: Subject to any disclaimer, the term of this patent is extended or adjusted under 35 U.S.C. 154(b) by 113 days.

(21) Appl. No.: 09/881,006

(22) Filed: Jun. 12, 2001

(65) Prior Publication Data

US 2002/0185317 A1 Dec. 12, 2002

(51) Int. Cl.[7] .................. G01G 19/52; G01G 23/14; G01G 21/10
(52) U.S. Cl. .................. 177/142; 177/168; 177/169; 177/187; 177/255; 177/DIG. 9; 177/210 R
(58) Field of Search ................ 177/132, 142, 177/133, 210 R, 211, 165, 168, 169, 187, 255

(56) References Cited

U.S. PATENT DOCUMENTS

| | | | | |
|---|---|---|---|---|
| 4,044,920 A | * | 8/1977 | Swartzendruber | 177/211 |
| 4,047,427 A | * | 9/1977 | Young | 177/211 |
| 4,219,091 A | * | 8/1980 | Kleinhans | 177/211 |
| 4,899,840 A | * | 2/1990 | Boubille | 177/139 |
| 5,313,022 A | * | 5/1994 | Piroozmandi et al. | 177/211 |
| 5,423,224 A | | 6/1995 | Paine | 73/855 |
| 5,600,104 A | * | 2/1997 | McCauley et al. | 177/187 |
| 5,770,823 A | * | 6/1998 | Piroozmandi | 177/132 |
| 6,320,142 B1 | * | 11/2001 | Burton et al. | 177/132 |

* cited by examiner

Primary Examiner—Randy W. Gibson
(74) Attorney, Agent, or Firm—James E. Brunton

(57) ABSTRACT

A method and apparatus for accurately determining the weight of the contents of a vessel at selected time intervals. The apparatus of the invention can be quickly and easily installed on an existing structure without requiring substantial modification to the structure. More particularly, in one form of the invention, the apparatus embodies small and inexpensive transducers that are conveniently mounted above the flanges that support the vessel legs.

16 Claims, 1 Drawing Sheet

METHOD AND APPARATUS FOR DETERMINING THE WEIGHT OF THE CONTENTS OF A VESSEL

BACKGROUND OF THE INVENTION

1. Field of the Invention

The present invention relates generally to weight measuring devices. More particularly, the invention concerns a method and apparatus for determining the weight of the contents of a vessel at selected time intervals.

2. Discussion of the Invention

It has been a common practice in the past to use load cells for measuring the weight of various types of articles or materials, such as those contained within vessels and hoppers. Such measurements have typically been accomplished through the use of load cells that are positioned beneath the legs of the article to be weighed. Because the load cells and their mounting hardware support the entire vessel and contents, the load cells are unduly expensive. Further, in order to install the load cells, the vessel or hopper must generally be raised a substantial distance and, in many instances, the legs of the tank or hopper must be cut or otherwise structurally modified in order to install the load cells. This approach can result in time delays and substantial expenditures of both time and money.

Another prior art approach sometimes used for measuring the weight of articles or materials contained within supporting structures involves the use of strain gage devices that are mounted within drilled holes formed in the structural members of the supporting structure. In such instance, the strain gages are adapted to measure the deformation of the hole in the structural member as the load is increased. Typically the installation of such strain gage devices is difficult and the reliability of such measurements are frequently suspect.

To overcome the drawbacks of prior art measuring systems of the character described in the preceding paragraphs, the present inventor developed a novel clamp-on structural strain gage sensor that can be mounted to dynamic load bearing structures such as sucker-rod type oil well pumps to produce an electrical output proportional to the deflection of the structures. This novel strain measuring apparatus is disclosed in U.S. Pat. No. 5,423,224 issued to the present inventor. Because of the pertinence of this patent to an understanding of the present invention, the patent is hereby incorporated by reference as though fully set forth herein.

In one embodiment of the invention described in U.S. Pat. No. 5,423,224 invention, the strain measuring apparatus of the invention can be used in conjunction with conventional weighing instrumentation such as a Weigh Meter and has the ability to convert the analog signal to a digital signal for processing and correction and then to reconfigure the data back to analog signals for input to the Weigh Meter.

As will be better understood from the discussion of which follows, the method of the present invention involves the installation of a thin, yieldably deformable, elastomeric pad under each leg of the vessel and then, as matter is either added to or taken from the vessel, measuring the deflection in the elastomeric pads using a sensor means that are conveniently mounted above the flanges that are affixed to the vessel support base and support the legs. This unique approach does not require any cutting or modification of the supporting legs and requires only that the vessel flanges be lifted above the support base a limited distance to accept the pads. Additionally, because only the deflection of elastomeric material beneath the legs is being measured the transducers can be small and quite inexpensive.

SUMMARY OF THE INVENTION

It is an object of the present invention to provide a method and apparatus for accurately determining the weight of the contents of a vessel at selected time intervals.

Another object of the invention is to provide a method of the aforementioned character that can be used as an inventory control technique for inventorying the contents of the vessel at any given time.

Another object of the invention is to provide an apparatus of the character described that can be quickly and easily installed on an existing structure without requiring substantial modification to the structure.

Another object of the invention is to provide an apparatus which embodies small and inexpensive transducers for determining the weight of the contents of the vessel.

Another object of the invention is to provide an apparatus of the character described in the preceding paragraphs in which the transducers are conveniently mounted above the flanges that support the vessel legs.

DISCUSSION OF THE INVENTION

Figure 2:
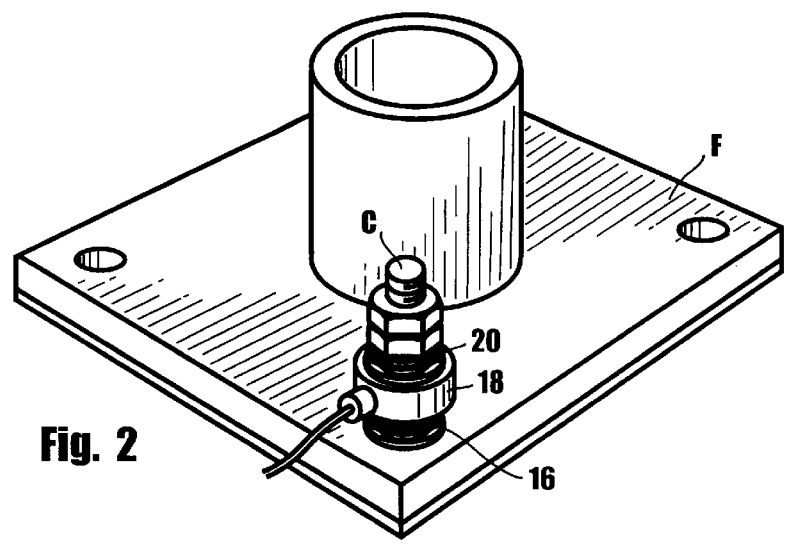
FIG. 2 is a greatly enlarged perspective view of one of the flanges of a leg that supports the vessel illustrating the manner in which the apparatus of the invention is connected to the flange.
Figure 1:
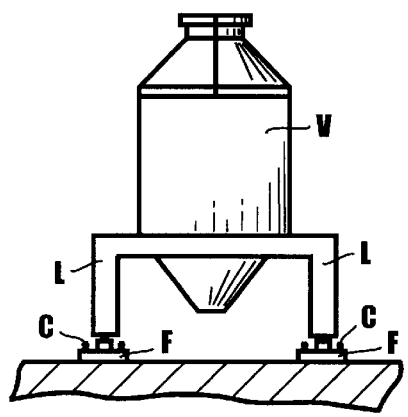
FIG. 1 is a side-elevational view of one type of storage vessel with which the apparatus of the invention can be used.

Referring to the drawings and particularly to FIGS. 1 and 2, one form of the apparatus of the invention for determining the weight of the contents of a vessel supported on the supporting surface of the base by a plurality of legs is there shown. As indicated in the drawings, each of the legs "L" which support the vessel "V" has a supporting flange "F" and a plurality of studs or connectors "C" that interconnect the flange with the concrete supporting base "B" (see also FIG. 3).

Figure 3:
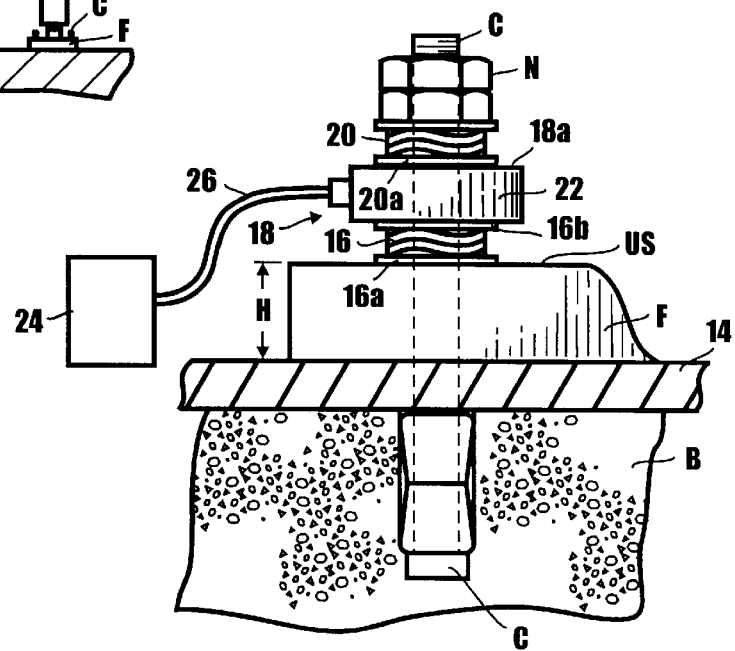
FIG. 3 is a greatly enlarged, cross-sectional view showing the manner of installation of the apparatus of the invention on one of the connectors that connect the leg flanges to the concrete supporting base.

In the form of the invention shown in the drawings, the apparatus comprises a yieldably deformable base member or pad 14 having a height or thickness "H". Pad 14 is mounted between the lower surface of each of the supporting flanges "F" and the upper surface of the support base "B" in the manner shown in FIG. 3. Circumscribing each of the connectors "C" that interconnect the supporting flanges "F" with support base "B" is a first, yieldably deformable element shown here as a deformable spring assembly 16. As illustrated in FIG. 3, the lower surface 16a of spring assembly 16 is in engagement with the upper surface "US" of flange "F".

Disposed in pressural engagement with the upper surface 16b of spring element 16 is the sensor means of the invention, which is here generally designated by the numeral 18. Sensor means 18 is disposed between first spring element 16 and a second spring element 20 that has a lower surface 20a that is in pressural engagement with the upper surface 18a of sensor means 18. In a manner presently to be described in greater detail, sensor means 18 functions to measure a change in the height of the yieldably deformable base member or pad 14 as the height thereof increases or decreases with the concomitant loading or unloading of the contents of the vessel "V". As indicated in FIG. 3, each of the first and second yieldably deformable elements 16 and 20 are loaded by a nut "N" in a manner so as to continuously exert a compressive force on the sensor means 18. The nuts "N" here comprise the means of the invention for exerting a compressive force on the first and second yieldably deformable elements or springs 16 and 20.

In the present form of the invention, the sensor means 18 comprises a transducer 22 of a conventional design that is adapted to measure changes in the compressive forces exerted on the transducer by the first and second yieldably deformable elements 16 and 20. As indicated in FIGS. 2 and 3, wherein one of the leg flanges is shown, transducer 22 circumscribes the connector "C" and functions to generate and transmit an electrical signal corresponding to the compressive forces exerted on the transducer by the responding to the compressive forces exerted on the transducer by the first and second yieldably deformably elements 16 and 20. Transducer 22 can be of various types, but a transducer manufactured and sold by Force Switch of La Verne, Calif. under the designation M7000 has proven satisfactory for the purpose.

Yieldably deformable member or pad 14 can take various forms including several different types of deformable compounds such as elastomers of various types including natural and synthetic rubber. Member 14 can also take the form of a spring that will yieldably deform in response to changes in the weight of the vessel.

In using the apparatus of the invention, the flanges "F" which support the vessel "V" are raised a small amount so that the yieldable, deformable material 14 can be positioned under each of the flanges. For each of the supporting flange assemblies, a nut "N" is then removed from a selected connector. For each connector, a first spring element 16 which preferably circumscribes the connector is inserted over the connector and is moved into engagement with the upper surface of flange "F" in the manner shown in FIG. 3. Next, the transducer 22, which also circumscribes connector "C", is place over the connector and moved into engagement with the upper surface of spring element 16. This done, spring element 20 which also preferably circumscribes connector "C" is inserted over the connector so that the lower surface 20a thereof engages the upper surface of the transducer 22. This done, the means for exerting a compressive force on the springs, which means here comprise the nuts "N" are threadably connected with the connectors "C" and are cinched down so that a compressive load is exerted on each of the transducers 22 by each of the spring elements 16 and 20.

With the construction thus described and as shown in FIG. 3, it is apparent that when matter is added to the vessel "V", the yieldably deformable base member 14 will be compressed and will decrease in height. This change in height is measured through the sensor or transducer 22 which is held captive between the nut "N" and the flange "F". This increase in compression in the deformable base member 14 is seen by the sensor as a lesser compression being exerted on the sensor by springs 16 and 20 and an appropriate signal representing this lesser compression is generated and transmitted to the data processing means 24 (FIG. 3) which includes the previously mentioned computer and Weigh Master, both of which are of conventional construction and are of a character well understood by those skilled in the art.

The signal that is transmitted from the sensor means to the data processing means via electrical connector 26 is processed by the data processing means in a manner such that the weight of the vessel at the instant of measurement is displayed on a suitable display panel that also forms a part of the data processing means.

It is, of course, apparent that when contents are removed from vessel "V", the height of the deformable base member 14 will increase causing a greater compression of spring elements 16 and 20. This increase in the compressive forces being exerted on the sensor means will, of course, be sensed by the sensor means and an appropriate signal will be generated and transmitted to the data processing means that will indicate to the observer the decreased weight of the matter then contained within the vessel "V". The methods of programming the computer and the associated elements of the data processing means to provide to the operator a direct read out of the weight of the matter contained within the vessel at any given time are well understood by those skilled in the art.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An apparatus for determining the weight of the contents of a vessel supported on a supporting surface by a plurality of legs, each said leg having a supporting flange and a connector interconnecting the supporting flange with the supporting surface, said apparatus comprising:
   (a) a yieldably deformable base member mounted between the supporting flange and the supporting surface, said first yieldably deformable member having a height;
   (b) a first yieldably deformable element mounted above the supporting flange and in engagement therewith;
   (c) a second yieldably deformable elements mounted above said first yieldably deformable element; and
   (d) sensor means disposed intermediate said first and second yieldably deformable elements for measuring a change in the height of said yieldably deformable base member, said first and second yieldably deformable elements each exerting a continuous compressive force on said sensor means.

2. The apparatus as defined in claim 1 in which said yieldably deformable base member comprises a yieldably deformable compound.

3. The apparatus as defined in claim 1 in which said yieldably deformable base member comprises an elastomer.

4. The apparatus as defined in claim 1 in which each of said first and second yieldably deformable elements circumscribe the connector.

5. The apparatus as defined in claim 1 in which said sensor means of comprises a transducer for measuring the compressive forces exerted thereon by said first and second yieldably deformable elements and for generating and transmitting a signal corresponding thereto.

6. The apparatus as defined in claim 5 further including computer means operably associated with said transducer for receiving said signal therefrom and for calculating the weight of the contents of the vessel based upon said signal.

7. An apparatus for determining the weight of the contents of a vessel supported on a supporting surface by a plurality of legs, each said leg having a supporting flange and a plurality of connectors interconnecting the supporting flange with the supporting surface, said apparatus comprising:

(a) a yieldably deformable base member mounted between at least one of the supporting flanges and the supporting surface, said first yieldably deformable member having a height that is changeable as a result of changes in the weight of the contents of the vessel;

(b) sensor means mounted above the supporting flange for measuring changes in compressive forces exerted thereon as a result of changes in the height of said yieldably deformable base member and for generating and transmitting signals corresponding to said changes in compressive forces;

(c) a first spring mounted intermediate the supporting flange and said sensor means, said first spring exerting a continuous compressive force on said sensor means;

(d) a second spring mounted above said sensor means, said second spring exerting a continuous compressive force on said sensor means; and (e) data processing means operably associated with said sensor means for receiving and processing signals transmitted by said sensor means.

8. The apparatus as defined in claim 7 in which said first and second spring circumscribe a selected one of the connectors.

9. The apparatus as defined in claim 7 in which said transducers circumscribes a selected one of the connectors.

10. The apparatus as defined in claim 7 on which said sensor means comprises a transducer disposed intermediate said first and second springs.

11. The apparatus as defined in claim 10 in which said transducer circumscribes a selected one of the connectors.

12. An apparatus for determining the weight of the contents of a vessel supported on a supporting surface by a plurality of legs, each said leg having a supporting flange and a plurality of connectors interconnecting the supporting flange with the supporting surface, said apparatus comprising:

(a) a yieldably deformable base member mounted between each of the supporting flanges and the supporting surface, each said first yieldably deformable member having a height that is changeable as a result of changes in the weight of the contents of the vessel;

(b) a transducer having upper and lower surfaces disposed above each of the supporting flanges for measuring changes in compressive forces exerted on said upper and lower surface and for generating and transmitting signals corresponding to said changes;

(c) a first spring mounted intermediate each of the supporting flanges and each said transducer for exerting a compressive force on said lower surface of said transducer;

(d) a second spring mounted above each said transducer for exerting a compressive force on said upper surface of said transducer; and (e) data processing means operably associated with each said transducer for receiving said signals generated thereby to determine changes in the weight of the contents of the vessel.

13. The apparatus as defined in claim 12 in which each of said first and second springs circumscribes a selected one of the connectors.

14. The apparatus as defined in claim 12 in which each of said transducer circumscribes a selected one of the connectors.

15. The apparatus as define din claim 12 further including means mounted above each said second spring for exerting a compressive force thereon.

16. The apparatus as defined in claim 12 in which said data processing means comprises a computer.

* * * * *